Figure 1:
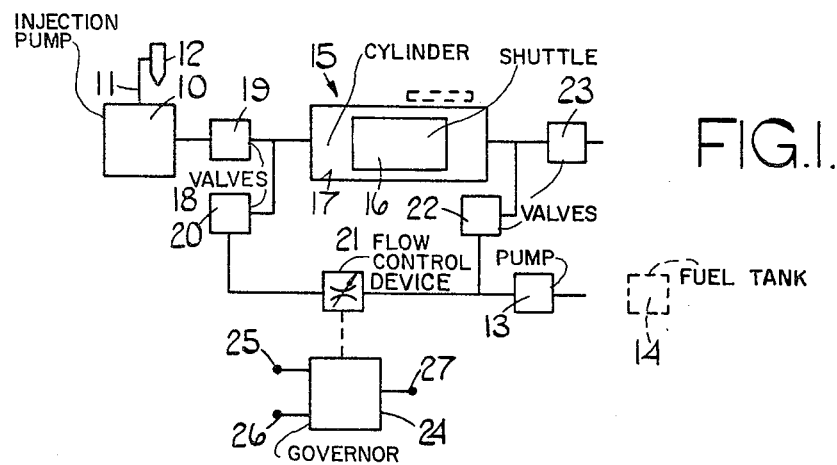

United States Patent [19]

Tumber et al.

[11] 4,328,697
[45] May 11, 1982

[54] TRANSDUCER CALIBRATION DEVICE

[75] Inventors: Brian W. Tumber, Greenford; Michael J. Davison, London, both of England

[73] Assignee: Lucas Industries Limited, Birmingham, England

[21] Appl. No.: 129,990

[22] Filed: Mar. 13, 1980

[30] Foreign Application Priority Data

May 23, 1979 [GB] United Kingdom ............... 7917902

[51] Int. Cl.³ ............................................. G01F 25/00
[52] U.S. Cl. ...................................... 73/3; 73/119 A; 123/333; 123/496
[58] Field of Search ........................ 73/3, 119 A, 168; 123/333, 496, 497

[56] References Cited

U.S. PATENT DOCUMENTS 3,463,130 8/1969 Reichardt et al. ............... 73/119 A
3,875,792 4/1975 Krohn et al. ..................... 73/119 A
4,171,638 10/1979 Coman et al. .................... 73/119 A Primary Examiner—S. Clement Swisher

[57] ABSTRACT

The output of a transducer is passed to an electrical circuit for supply to a fuel control network. In order to check the output of the transducer the output of the electrical circuit is sampled in a sample circuit when the movement of the member associated with the transducer is a known value. The signal from the sample circuit is compared in a comparator with a reference signal. Any difference is passed to a gain determining circuit which calculates a new gain value for a variable gain amplifier in the electrical circuit. The value of the gain is retained in a holding circuit and supplied to the amplifier until further adjustment is required.

14 Claims, 9 Drawing Figures

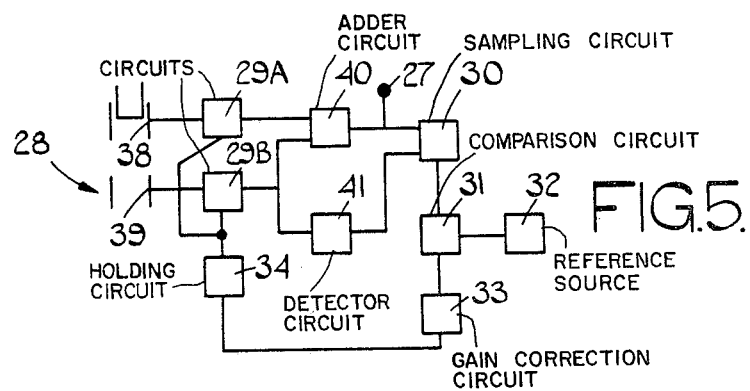
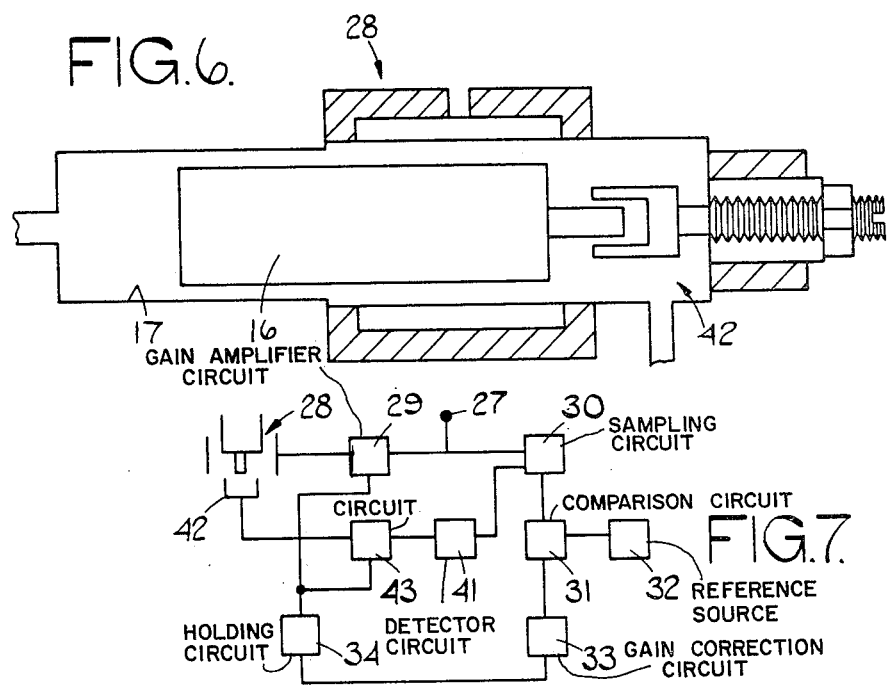
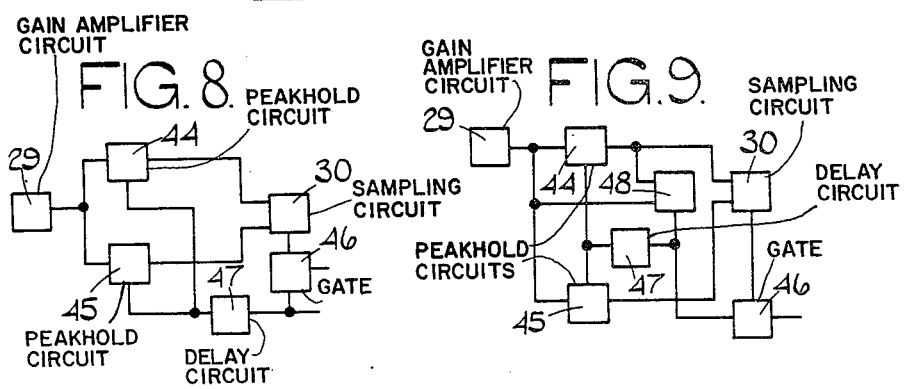

TRANSDUCER CALIBRATION DEVICE

This invention relates to a transducer calibration device for use with transducer means associated with a metering device of a liquid fuel injection pumping apparatus, the apparatus being of the kind comprising an injection pump which in use delivers fuel at high pressure to an associated engine, a source of fuel at low pressure, a metering device comprising a shuttle slidable within a cylinder, valve means operable in timed relationship with the injection pump to allow fuel to flow from one end of the cylinder to the injection pump during a filling period of the injection pump and to allow fuel to flow from said source to said one end of the cylinder during the period between successive filling strokes of the injection pump and means for controlling the rate of fuel supplied to said one end of the cylinder, said transducer means including a transducer and an electrical circuit to which the output of said transducer is supplied and which supplies an output signal indicative of the position of the shuttle within the cylinder.

The output signal is utilised in a control system which determines the setting of said control means whereby the correct amount of fuel is supplied to the engine appropriate to the load on the engine and/or the demanded engine speed. The output of the transducer will be of an electrical nature and the aforesaid signal also of an electrical nature. The output of the transducer for a given stroke of the shuttle may vary over a period of time due for example to temperature variation and the characteristics of the electrical circuit may also change with time and temperature. It is therefore necessary to check the calibration of the transducer means at intervals and if necessary effect adjustment of the electrical circuit to ensure that the signal provides a true indication of the shuttle movement and therefore the quantity of fuel which is supplied to the engine.

During the operation of the shuttle it will contact a stop at the aforesaid one end of the cylinder and it is to be expected that during operation of the associated engine it will move at least a predetermined distance away from the one end of the cylinder. When the shuttle has moved the predetermined distance the output signal can be compared with a reference signal appropriate to that distance, and if there is an error the characteristics of the electrical circuit adjusted to correct the output signal.

According to the invention a transducer calibration device comprises first means for sampling said output signal when the shuttle has moved a predetermined distance away from said one end of the cylinder, second means for comparing the sampled signal with a reference signal, third circuit means for determining from a difference signal provided by said second means, a correction signal which is applied to said electrical circuit and fourth circuit means for holding the signal applied to the electrical circuit constant at least until the output signal is again sampled.

Figure 2:
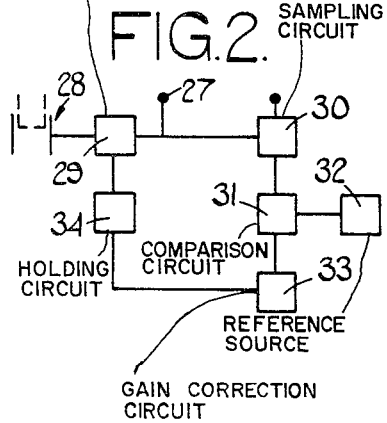
Figure 3:
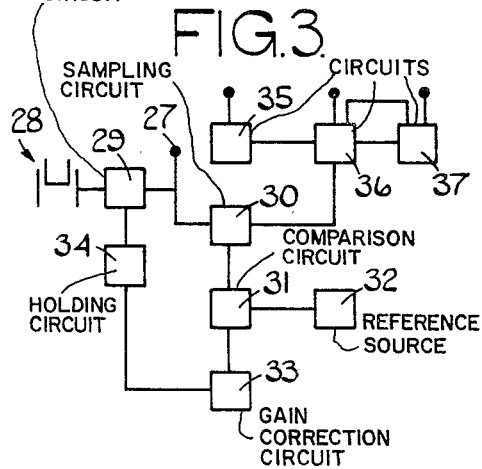
Figure 4:
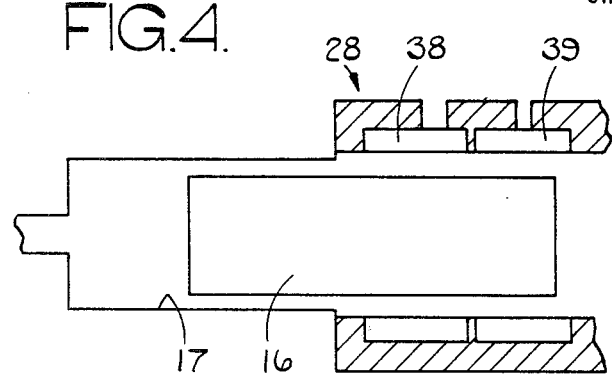

Reference will now be made to the accompanying drawings in which:

FIG. 1 is a block diagram of a fuel injection pumping apparatus,

FIG. 2 shows a block diagram of a calibration system suitable for use with an "all speed" governor, FIG. 3 is a block diagram of a calibration system suitable for use with a "two-speed" governor, FIG. 4 is a diagrammatic representation of the shuttle together with a form of transducer, FIG. 5 is a block diagram similar to the block diagram of FIG. 2 but appropriate for use with the transducer shown in FIG. 4, FIG. 6 is a view similar to FIG. 4 showing an alternative form of transducer, FIG. 7 is a block diagram of a circuit suitable for use with the form of transducer shown in FIG. 6 and, FIGS. 8 and 9 show modifications for use with the circuits of FIGS. 2 and 3.

With reference to FIG. 1 of the drawings, the pumping apparatus comprises an injection pump 10 which in use is driven in timed relationship with an associated engine and which has a plurality of outlets only one of which is shown at 11, which in use are connected to fuel injection nozzles 12 respectively of the associated engine.

The apparatus also includes a source of fuel at low pressure conveniently in the form of a pump 13 which draws fuel from for example a fuel tank diagrammatically indicated at 14. The output pressure of the pump 13 is controlled in any convenient manner.

Fuel is supplied to the injection pump 10 from the pump 13 by way of a metering device generally indicated at 15 but which comprises a shuttle 16 slidably accommodated within a cylinder 17. One end of the cylinder 17 is connected to an inlet 18 of the injection pump by way of a valve 19 and the same end of the cylinder is connected through a valve 20 to the output of the pump 13 by way of a flow control device 21. The other end of the cylinder 17 can be connected by way of a valve 22, to the outlet of the pump 13 or to a suitable drain by way of a valve 23. The valves 19, 20, 22 and 23 are operated in timed relationship with the injection pump, the valves 19 and 22 being opened together whilst the valves 20 and 23 remain closed and vice versa. When the valves 19 and 22 are opened, fuel flows from the pump 13 to the aforesaid other end of the cylinder 17 and the shuttle 16 is displaced towards the one end of the cylinder i.e. towards the left as seen in FIG. 1, the fuel from the one end of the cylinder flowing by way of the valve 19 to the inlet 18 of the injection pump. Such flow of fuel occurs during a filling stroke of the injection pump. The shuttle 16 will contact stop means at the one end of the cylinder and this stop means conveniently is the end wall of the cylinder. When the filling of the injection pump is completed, the latter partakes of a delivery stroke and during this time the valves 19 and 22 are closed and the valve 20 and 23 open. Fuel therefore flows from the outlet of the pump 13 by way of the flow control device 21 to the one end of the cylinder and the shuttle 16 is displaced towards the other end of the cylinder i.e. towards the right as seen in FIG. 1, fuel displaced from the other end of the cylinder flowing by way of the valve 23 to a drain. The amount of fuel which flows to the one end of the cylinder and hence the position of the shuttle 16 in the cylinder at the end of the time allowed for the flow of fuel, will depend upon the setting of the flow control device 21. At the end of the delivery stroke of the injection pump, the valves 20 and 23 are closed and the valves 19 and 22 opened. Thereafter the cycle is repeated as described. The displacement of the shuttle is a measure of the amount of fuel supplied to the injection pump during the following delivery stroke and as mentioned this can be varied by adjusting the setting of the flow control means.

The setting of the flow control means is determined by a governor indicated at 24. Conveniently the governor is of an electrical nature to which an actual engine speed signal is supplied by way of terminal 25, a demanded speed or fuel signal by way of a terminal 26 and an engine fuel signal by way of a terminal 27. The engine fuel signal is derived from a transducer 28 associated with the metering shuttle 16. The circuits within the governor determine the amount of fuel which should be supplied to the engine, adjust the setting of the flow control device 21 and check that the correct amount of fuel is being supplied to the engine.

The governor 24 may be of the so called "all speed" variety in which case the demanded signal which is applied to the terminal 26 by an operator control, represents a desired engine speed and the governor will adjust the setting of the fuel control device to ensure that the engine receives sufficient fuel for it to maintain the demanded speed. Clearly the governor will include various circuits which ensure that various engine operating parameters are not exceeded for example a maximum engine speed. The governor 24 may however be of the so called "two-speed" variety in which case the signal applied to the terminal 26 is a demanded fuel signal and the fuel flow control device will be adjusted directly in accordance with the signal applied to the terminal 26. Again however the governor may modify the setting of the flow control device 21 to ensure that various engine operating parameters are not exceeded.

With reference now to FIG. 2 the transducer 28 is shown as a capacitive transducer the output of which is supplied to an electrical circuit 29 which includes an adjustable gain amplifier. The output of the circuit 29 is the signal which is applied to the terminal 27. The output signal may be of an analogue or a digital nature, and an input is supplied to the circuit 29 from the governor when it is known that the shuttle will be at the aforesaid one end of the cylinder so that the output signal will register zero. First circuit means in the form of a sampling circuit 30 is provided which upon receipt of a signal from the governor indicating when maximum fuel is being supplied and also indicating when the shuttle should be at the aforesaid other end of the cylinder, samples the output signal from the circuit 29. The output of the circuit 30 is applied to a second means in the form of a comparison circuit 31 which also receives a signal from a reference source 32. Any error between the two signals is applied to third means in the form of a gain correction circuit 33 which calculates from the magnitude of the error signal, the adjustment required to the gain of the aforesaid amplifier in the circuit 29. The signal from the circuit 33 is supplied to the circuit 29 by way of fourth means in the form of a holding circuit 34. The holding circuit stores the gain signal until further adjustment of the gain is required. The circuit of FIG. 2 is particularly suited for use with an "all speed" governor since this form of governor frequently requires that maximum fuel should be supplied to the engine for the purpose of accelerating the engine. When the governor is of the "two-speed" variety then it is possible that a considerable period may lapse before maximum fuel is required and in such circumstances the correction of the calibration of the transducer may take place at undesirably long intervals.

Turning now to FIG. 3 the circuits thereof which have the same function as those of FIG. 2 have the same reference numerals. In addition circuits are provided which sense when the fuel flow control device 21 is set by the governor 24 so that the level of fuel flow is at least 70% of the maximum, cause one delivery of fuel at the maximum quantity, cause the sampling circuit as described with reference to FIG. 2 to operate and then inhibit the operation of the sampling circuit for a predetermined number of filling strokes of the injection pump or for a predetermined time.

A circuit 35 is provided which generates a control signal when the fuel level is at least 70% of the maximum level. The output of the circuit 35 is applied to a circuit 36 which upon receipt of this signal causes the governor circuit 24 to adjust the flow control device 21 so that maximum fuel is supplied to the injection pump at the next filling stroke. With maximum fuel the shuttle 16 contacts the ends of the cylinder. The circuit 36 also actuates the sampling circuit 30 which samples the output signal from the circuit 29 as a result of the shuttle moving its maximum extent. As previously described the sampled signal is compared with the reference and a correction signal generated if such is required. The operation of the circuit 36 is then prevented for a predetermined number of filling strokes of the injection pump by a circuit 37 which is a counter which starts to count as soon as the circuit 36 receives the signal from the circuit 35. Thus after for example 1000 filling strokes, the signal is sampled again and the process is repeated so long as the level of fuel flow is at least 70% of the maximum. It will be appreciated that once sampling has taken place the flow control device is returned to the setting appropriate for the demand on the engine. It has been found that the supply for one injection stroke only of maximum fuel has no significant effect upon the engine performance or the level of smoke in the engine exhaust. The circuit 37 may be a timer which allows operation of the circuit 36 at say one minute intervals.

In the arrangement to be described with reference to FIGS. 4 and 5 the movement of the shuttle from the one end of the cylinder to a pre-determined position short of the other end of the cylinder is utilised to calibrate the transducer. Conveniently this position is equivalent to 70% of the maximum travel of the shuttle.

In FIG. 4 there is shown the shuttle 16 and the cylinder 17. The transducer 28 is also shown but in this arrangement it is formed in two parts 38, 39. The two parts together provide the signal indicative of the position of the shuttle but the part 39 also provides a signal which indicates when the shuttle has moved 70% of its maximum travel. In FIG. 5 the circuits which have the same function as those in FIG. 2 have the same reference numerals. It will be noted that the two parts of the transducer 38, 39 are associated with circuits 29a, 29b respectively. These circuits are each the same as the circuit 29 but their outputs are added in an adder circuit 40 to provide the signal to the terminal 27. The output of the circuit 29b is however applied to a detector circuit 41 and the output of this circuit is utilised to effect operation of the sampling circuit 30 at the instant when the detector circuit 41 indicates that the shuttle has moved the pre-determined distance. In this case the signal provided by the reference source is appropriate to the chosen pre-determined position.

In the arrangement shown in FIGS. 6 and 7 the position of the shuttle is sensed by a separate transducer which does not contribute to the shuttle position signal supplied to the governor. As shown in FIG. 6 the separate transducer is referenced at 42 and is adjustably mounted. As shown in FIG. 7 the output of the transducer is applied to a circuit 43 which performs the same function as the circuit 29 and is then supplied to the detector circuit 41 the output of which controls the operation of the sampling circuit 30 as previously described. The circuit 43 is not essential if the detector circuit is sufficiently sensitive.

The arrangements described require the governor circuit to provide a signal to the circuits 29, 29a, 29b and 43 to zero the output of those circuits when the shuttle is at the aforesaid one end of the cylinder. In addition the governor must provide a further signal to effect operation of the sampling circuit in the embodiments shown in FIGS. 2 and 3. This means that the governor must also be supplied with signals indicative of the position of the parts of the pump. The signals in the case of a rotary pump can be obtained by a sensor associated with the pump drive shaft.

By modifying the circuit it is possible in the embodiments of FIGS. 2 and 3, to avoid the need to provide two signals. The modification is shown in FIG. 8. In this Figure the output of the circuit 29 is supplied to two peak hold circuits 44, 45. The circuit 44 holds the upper value of the output from circuit 29 and the circuit 45 the lower value. These two values are supplied to the sampling circuit 30 which receives a synchronizing signal from the governor by way of a gate 46 which is opened when the maximum fuel is demanded. Thus the sampling circuit samples the difference between the two peak values and this is compared with the reference as described and correction of the gain of the amplifier in circuit 29 effected if this should be necessary. The synchronizing signal passes through a delay circuit 47 and serves to reset the peak hold circuits after sampling has taken place.

The modification described in FIG. 8 can be further modified to avoid the need to form a synchronizing signal to be supplied by the governor. The modification is seen in FIG. 9 and it comprises a circuit 48 which receives the signals from the circuits 29 and 44 and only when the output from the circuit 29 is less than the output of the circuit 44 does it provide a signal which is the equivalent of the synchronizing signal. This signal is passed by way of the gate 46 to the sampling circuit 30 and to allow time for sampling to take place by way of the delay circuit 47 to effect resetting of the circuits 44 and 45.

With the systems described there is no need to calibrate the pump and the transducer calibration device together. Calibration is achieved automatically when the two are connected together and operated. It is of course necessary to ensure the reference source in the calibration device is correctly set and also that the shuttle of the pump is set so that for the allowed maximum fuel quantity the shuttle moves up to the ends of the cylinder in which it is located. This adjustment can be effected by an adjustable stop at the one or the other end of the cylinder. In the case where calibration is effected at 70% shuttle stroke the appropriate adjustment must be made to ensure that the transducer signal occurs at 70% stroke.

We claim:

1. A transducer calibration device for use with a transducer means associated with a metering device of a liquid fuel injection pumping apparatus, the apparatus being of the kind comprising an injection pump which in use delivers fuel at high pressure to an associated engine, a source of fuel at low pressure, a metering device comprising a shuttle slidable within a cylinder, valve means operable in timed relationship with the injection pump to allow fuel to flow from one end of the cylinder to the injection pump during a filling period of the injection pump and to allow fuel to flow from said source to said one end of the cylinder during the period between successive filling strokes of the injection pump and means for controlling the rate of fuel supplied to said one end of the cylinder, said transducer means including a transducer and an electrical circuit to which the output of said transducer is supplied and which supplies an output signal indicative of the position of the shuttle within the cylinder, the calibration device comprising first means for sampling said output signal when the shuttle has moved a predetermined distance away from said one end of the cylinder, second means for comparing the sampled signal with a reference signal, third circuit means for determining from a difference signal provided by said second means, a correction signal which is applied to said electrical circuit and fourth circuit means for holding the signal applied to the electrical circuit constant at least until the output signal is again sampled.

2. A device according to claim 1 in which said electrical circuit includes a variable gain amplifier.

3. A device according to claim 2 including fifth means for sensing when the amount of fuel supplied by the injection pump is at a predetermined level of the maximum quantity, and sixth means which receives a signal from said fifth means when the amount of fuel supplied by the injection pump is at or above said predetermined level and which causes adjustment of said fuel control means to cause the shuttle to move the maximum amount at the same time causing operation of said first means to sample the signal provided by the transducer means.

4. A device according to claim 3 in which said sixth means includes a counter operative to prevent operation of the first means until a predetermined number of filling strokes of the injection pump have taken place.

5. A device according to claim 3 in which said sixth means includes a timer which allows operation of said first means at predetermined time intervals.

6. A device according to claim 2 including seventh means for detecting a predetermined movement of the shuttle and for causing operation of said first means to sample the signal provided by the transducer means.

7. A device according to claim 6 in which said seventh means is provided with a signal from said transducer means.

8. A device according to claim 6 including a further electrical circuit for supplying a signal to said seventh means from said transducer means.

9. A device according to claim 8 in which the transducer means includes first and second parts providing signals to said circuits respectively, the device including an adding circuit which combines the outputs of said circuits for supply to the first means.

10. A device according to claim 8 in which the transducer means includes a transducer for providing a signal to said further circuit means when the shuttle has moved a predetermined distance whereby said seventh means causes operation of said first means.

11. A device according to claim 9 in which said first and second parts of the transducer means are disposed in spaced side by side relationship about said shuttle.

12. A device according to any one of the preceding claims including means operative when the shuttle is at said one end of the cylinder for ensuring that the output of said electrical circuit or circuits is zero.

13. A device according to claim 2 including a pair of peak hold circuits which receive the signal from said electrical circuit, said hold circuits holding the upper and lower peak values of the signal provided by said electrical circuit respectively, the outputs of said peak hold circuits being passed to said first means, means for supplying synchronising signals to said first means in timed relationship to the operation of said shuttle, a gate through which said synchronising signals can pass, means for providing a signal to said gate to open the gate when the amount of fuel supplied to the injection pump is at its maximum and a delay circuit through which said synchronising signals pass to said peak hold circuits to reset said circuits, said first means sampling the difference between the signals stored by the peak hold circuits.

14. A device according to claim 13 in which said synchronising signals are derived from a synchronising circuit which receives signals from said electrical circuit and the one of said peak hold circuits which stores the upper value of the signal provided by said electrical circuit, said synchronising circuit providing synchronising signals when the output from said electrical circuit is less than the output of said one peak hold circuit.

\* \* \* \* \*